United States Patent [19]
Shishino

[11] Patent Number: 6,108,563
[45] Date of Patent: Aug. 22, 2000

[54] COMMUNICATION CONTROL APPARATUS FOR PROVIDING MANAGEMENT AND CALL CONTROL OF MOBILE STATIONS IN RADIO COMMUNICATION SYSTEM

[75] Inventor: Shinichi Shishino, Ome, Japan

[73] Assignee: Kabushiki Kaishi Toshiba, Kanagawa-ken, Japan

[21] Appl. No.: 08/821,474

[22] Filed: Mar. 21, 1997

[30] Foreign Application Priority Data

Mar. 29, 1996 [JP] Japan ................................. 8-076192

[51] Int. Cl.⁷ ........................................... H04Q 7/30
[52] U.S. Cl. ...................... 455/560; 455/414; 455/422; 455/436
[58] Field of Search .................................. 455/403, 405, 455/406–408, 410–411, 414, 422, 421, 436, 439, 445, 520, 560, 565

[56] References Cited

U.S. PATENT DOCUMENTS

| | | | |
|---|---|---|---|
| 4,977,589 | 12/1990 | Johnson et al. | 455/403 |
| 5,101,502 | 3/1992 | Felderman et al. | 455/520 X |
| 5,257,406 | 10/1993 | Ito | 455/445 |
| 5,335,278 | 8/1994 | Matchett et al. | 455/410 X |
| 5,473,671 | 12/1995 | Partridge | 455/445 |
| 5,568,153 | 10/1996 | Beliveau | 455/440 X |
| 5,752,189 | 5/1998 | Ueno et al. | 455/435 |
| 5,765,108 | 6/1998 | Martin et al. | 455/422 |
| 5,819,171 | 10/1998 | Hoogerwerf et al. | 455/410 |

FOREIGN PATENT DOCUMENTS

| | | | |
|---|---|---|---|
| 6-14362 | 1/1994 | Japan | H04Q 7/04 |
| 5-209786 | 3/1995 | Japan . | |

*Primary Examiner*—William G. Trost
*Attorney, Agent, or Firm*—Limbach & Limbach L.L.P.

[57] ABSTRACT

A communication setting pattern indicating whether or not the mobile stations located in the radio zone are permitted to communicate is set for each radio zone in a communication setting memory. In a case where a call request related to a mobile station located in the service area has been made, a CPU carries out the call process corresponding to the call request only when the communication pattern permits communication in the radio zone where the mobile station related to the call request is located. When the communication setting pattern stored in the communication setting memory has been changed, the CPU disconnects the call related to the mobile station in a case where a busy mobile station is located in the radio zone where the changed communication permit/inhibit information inhibits communication.

13 Claims, 17 Drawing Sheets

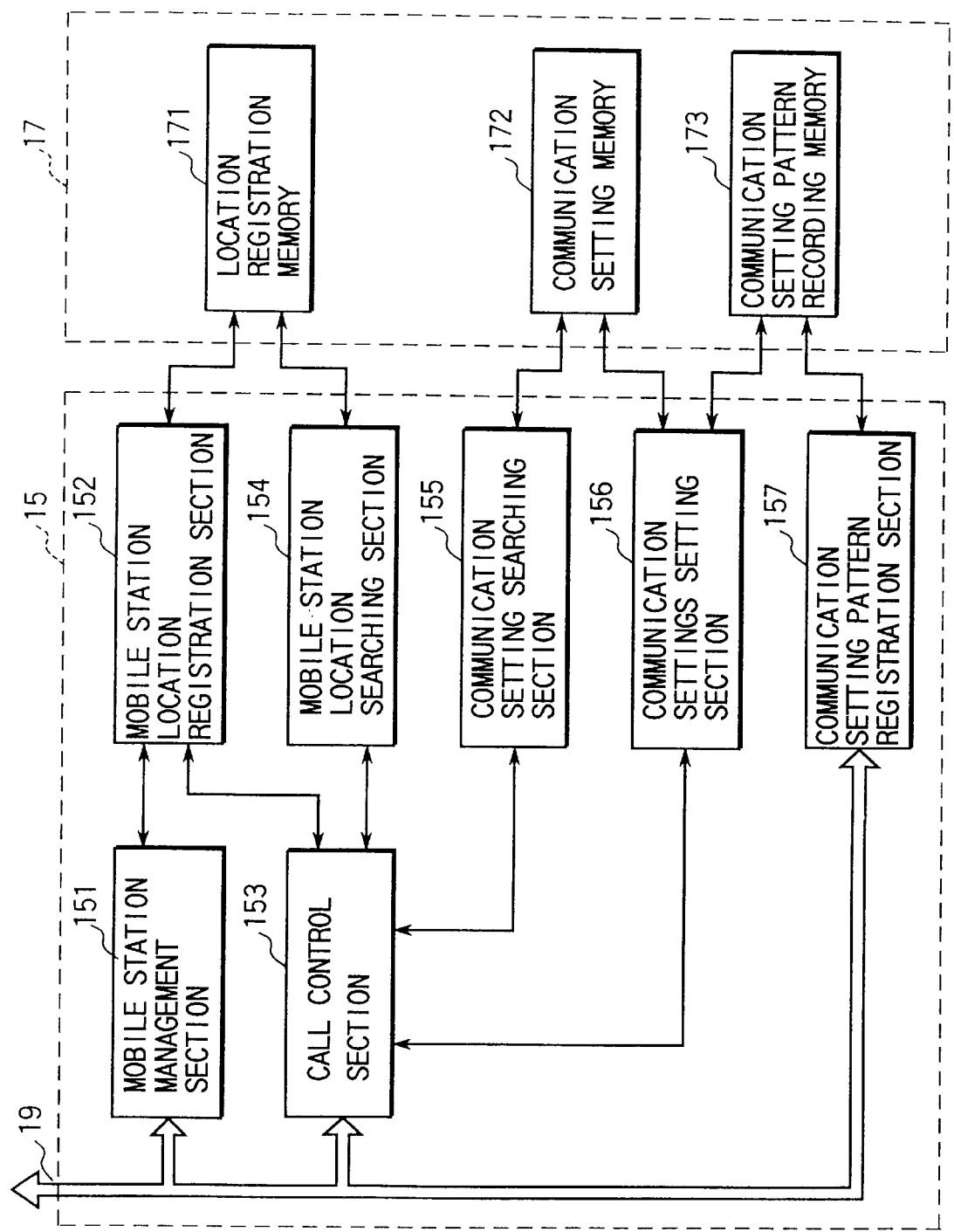
F I G. 2

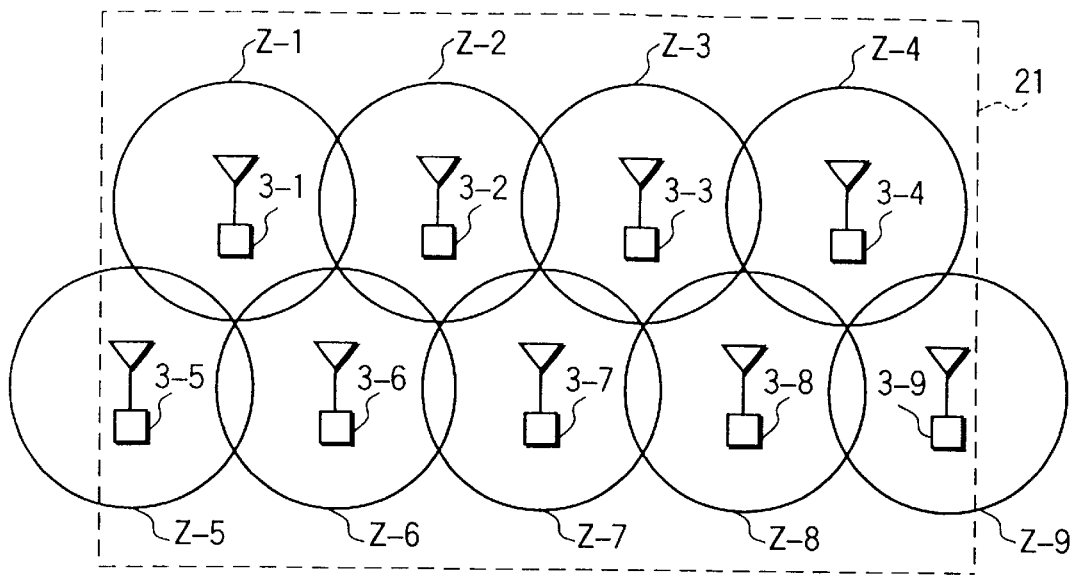
F I G. 3
| RADIO ZONE NAME | PURPOSE OF USE |
|---|---|
| Z-1~Z-4, Z-6 | RECREATION FACILITIES |
| Z-5, Z-8, Z-9 | ENTRANCE, EXIT, PUBLIC SQUARE |
| Z-7 | MULTIPURPOSE HALL |
F I G. 4
| TIME ZONE | STATE OF USE | CALL PERMITTED OR REGULATED |
|---|---|---|
| 0:00~10:00 | OPEN | PERMITTED |
| 10:00~12:00 | IN PERFORMANCE | REGULATED |
| 12:00~15:00 | OUT OF PERFORMANCE | PERMITTED |
| 15:00~17:00 | IN PERFORMANCE | REGULATED |
| 17:00~24:00 | OPEN | PERMITTED |
F I G. 5

| RADIO ZONE NAME | PATTERN NUMBER | |
| --- | --- | --- |
| | 1 | 2 |
| Z-1 | PERMITTED | PERMITTED |
| Z-2 | PERMITTED | PERMITTED |
| Z-3 | PERMITTED | PERMITTED |
| Z-4 | PERMITTED | PERMITTED |
| Z-5 | PERMITTED | PERMITTED |
| Z-6 | PERMITTED | PERMITTED |
| Z-7 | PERMITTED | REGULATED |
| Z-8 | PERMITTED | PERMITTED |
| Z-9 | PERMITTED | PERMITTED |

F I G. 6

| SETTING TIME | PATTERN NUMBER |
| --- | --- |
| 10:00 | 2 |
| 12:00 | 1 |
| 15:00 | 2 |
| 17:00 | 1 |

F I G. 7

| RADIO ZONE NAME | COMMUNICATION SETTING |
|---|---|
| Z-1 | PERMITTED |
| Z-2 | PERMITTED |
| Z-3 | PERMITTED |
| Z-4 | PERMITTED |
| Z-5 | PERMITTED |
| Z-6 | PERMITTED |
| Z-7 | REGULATED |
| Z-8 | PERMITTED |
| Z-9 | PERMITTED |

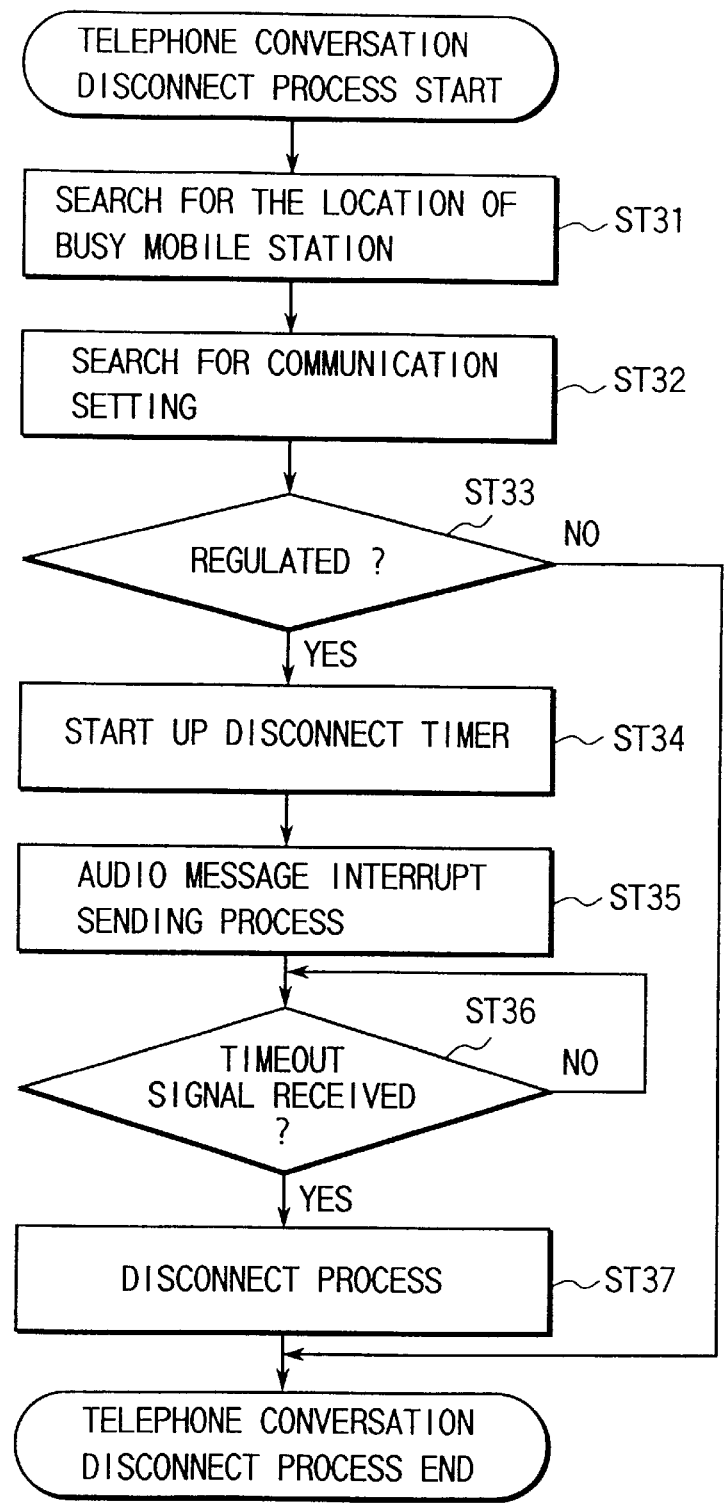
F I G. 1 2

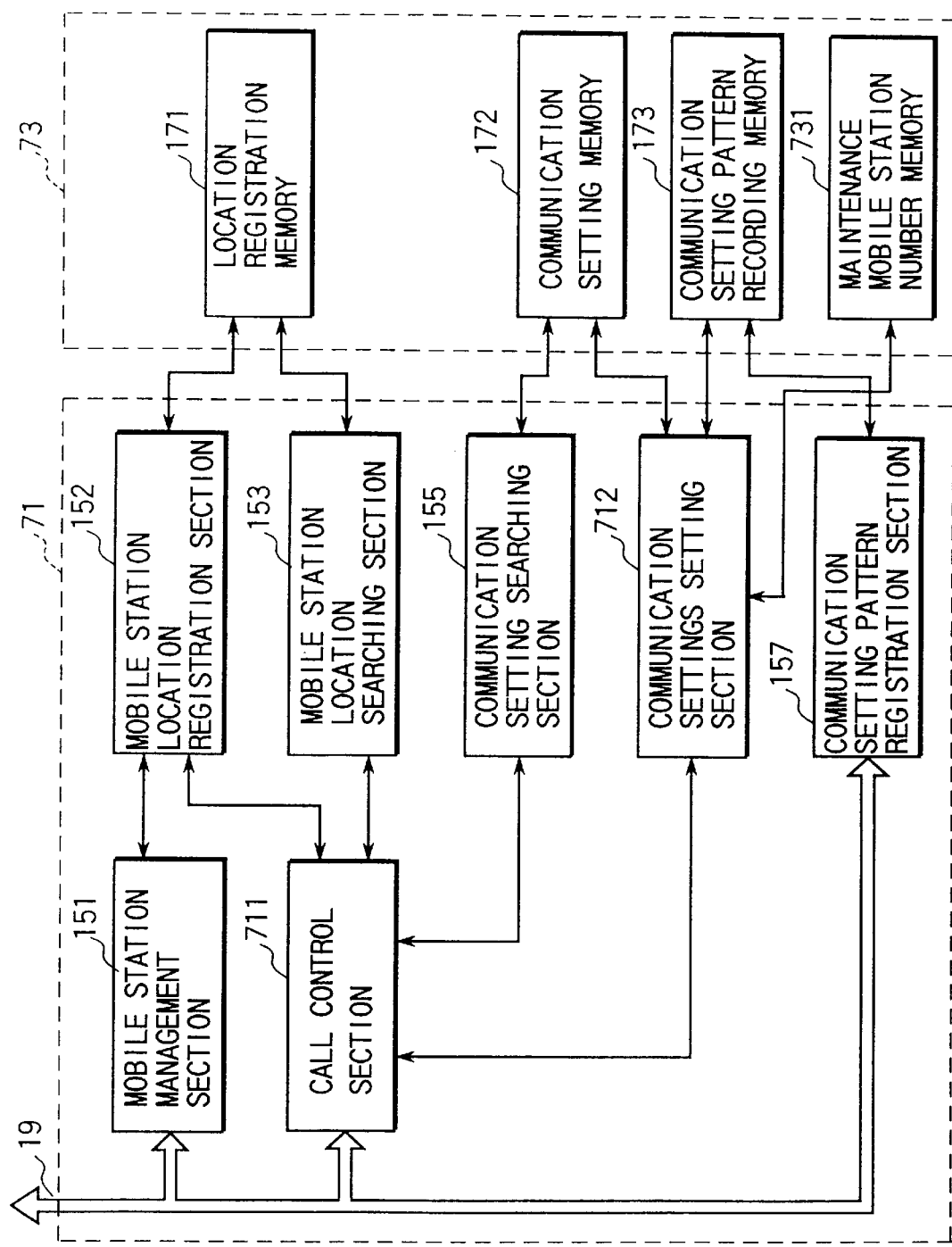
F I G. 14

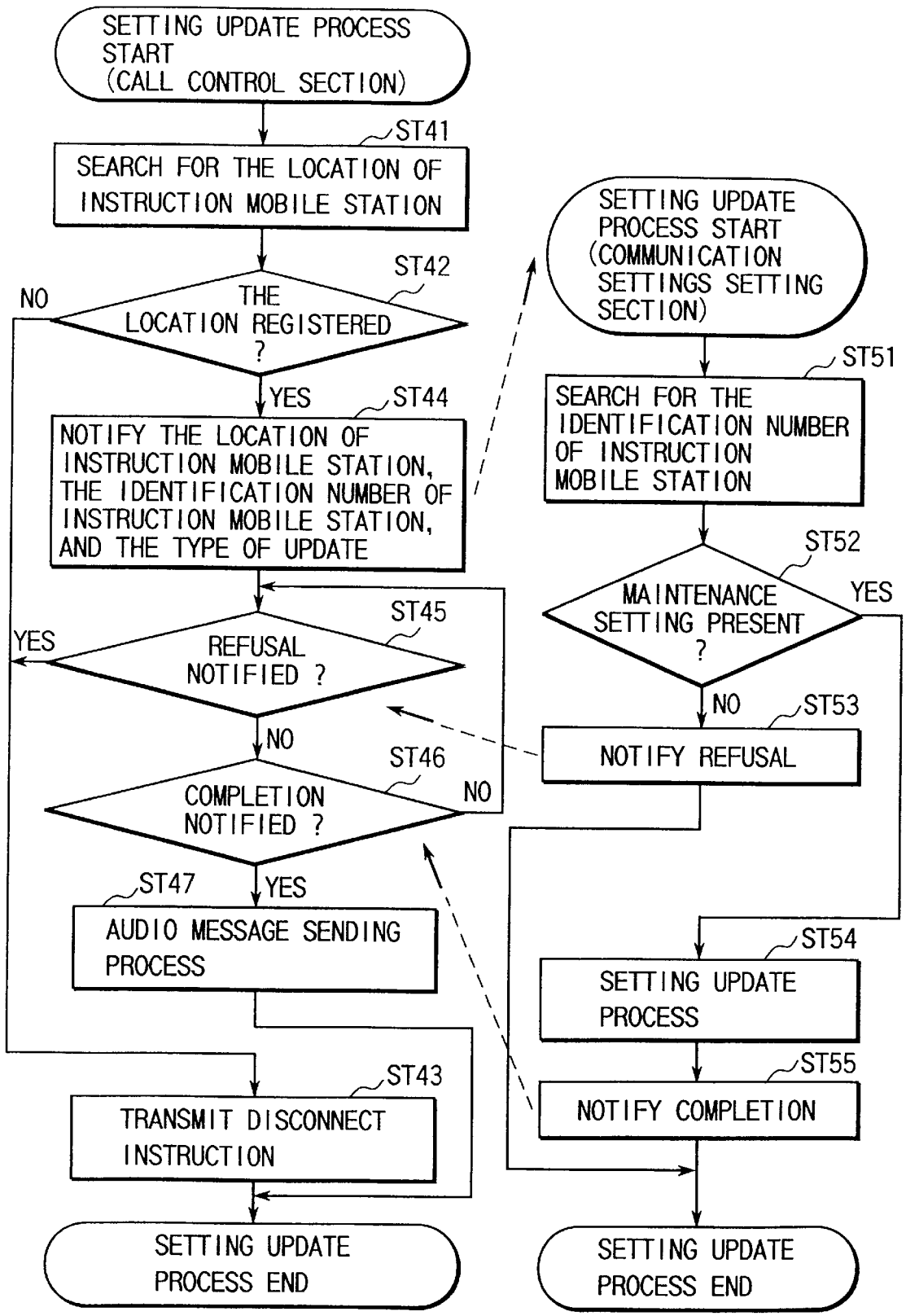
F I G. 1 5

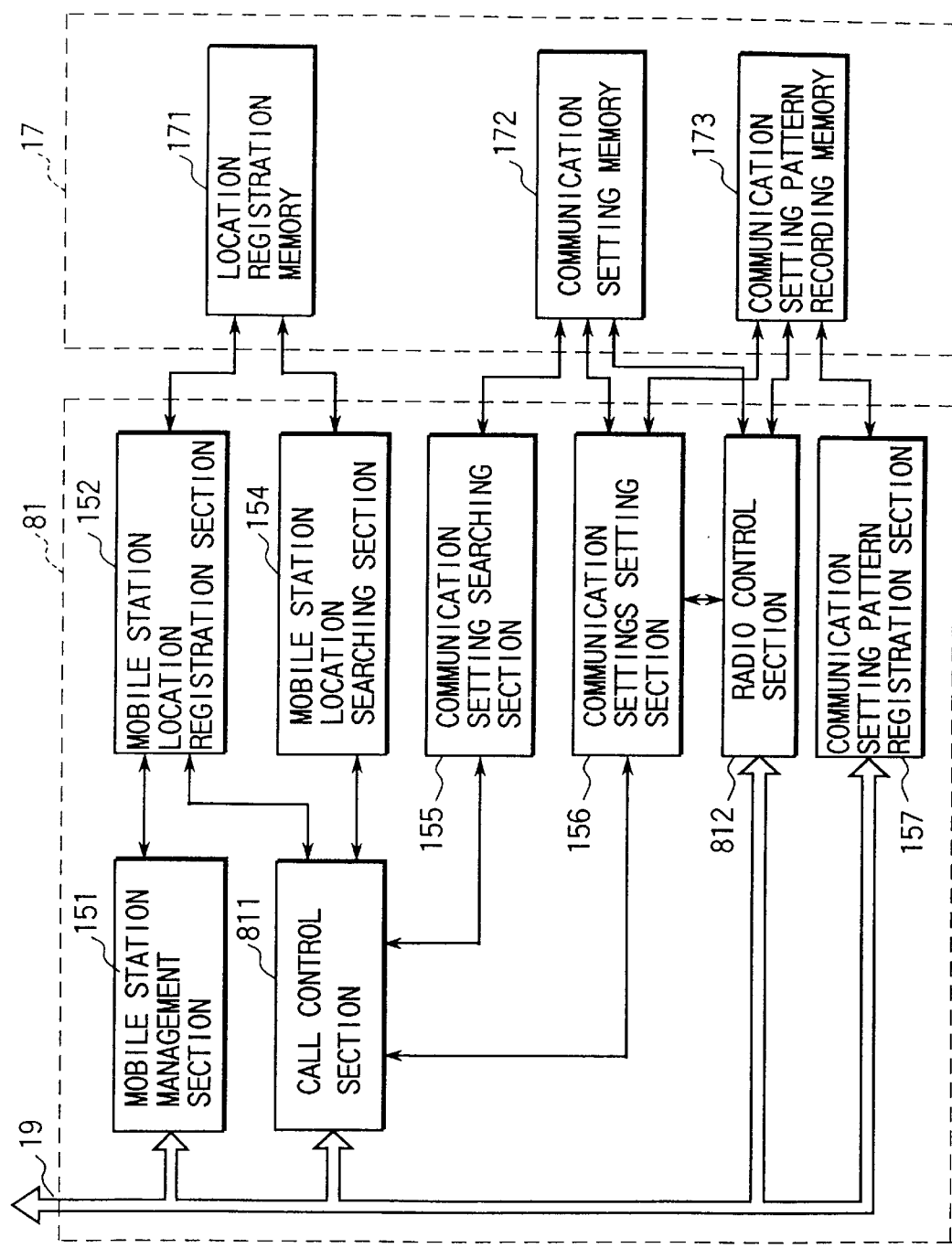
F I G. 17

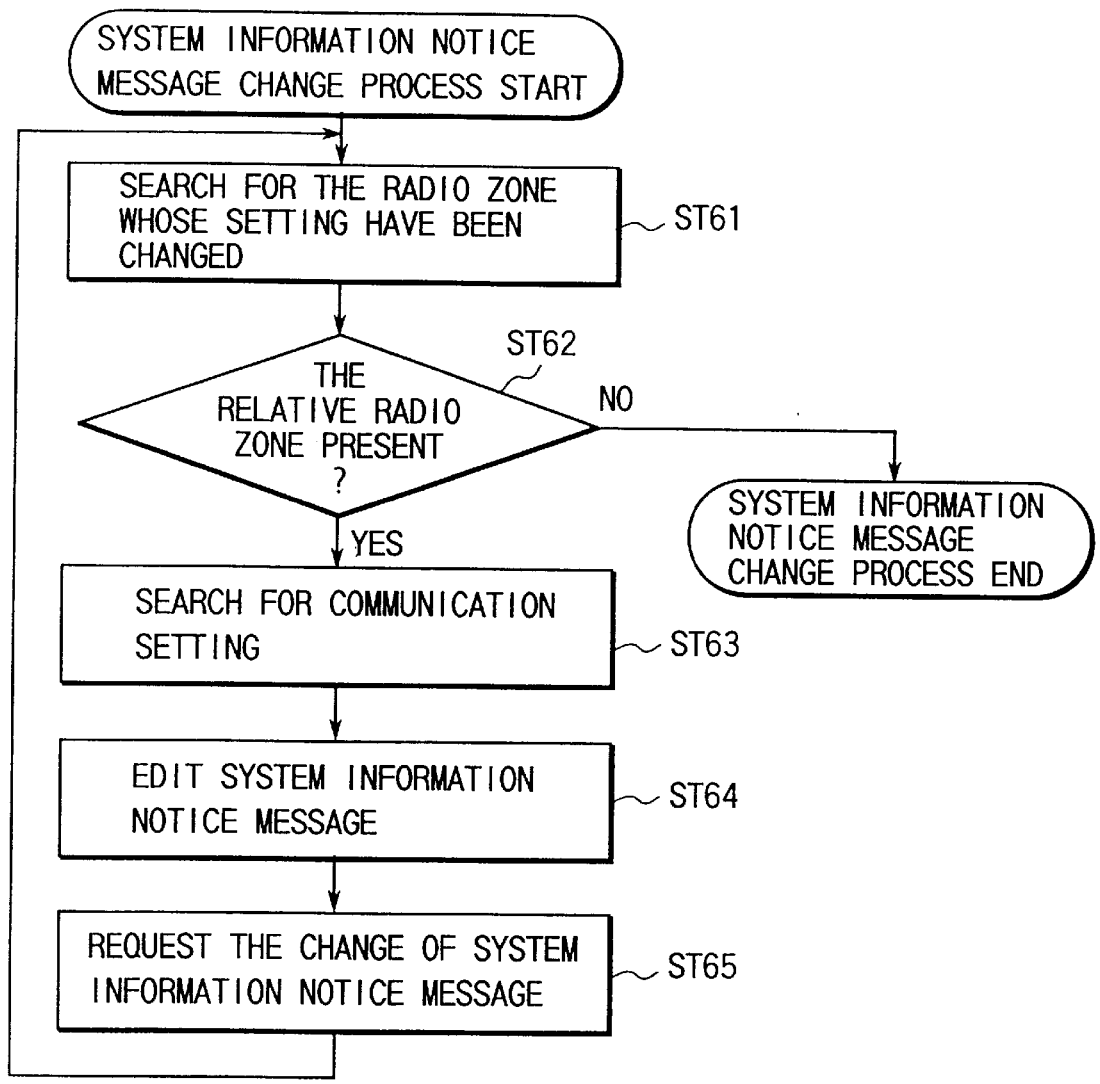
F I G. 1 8

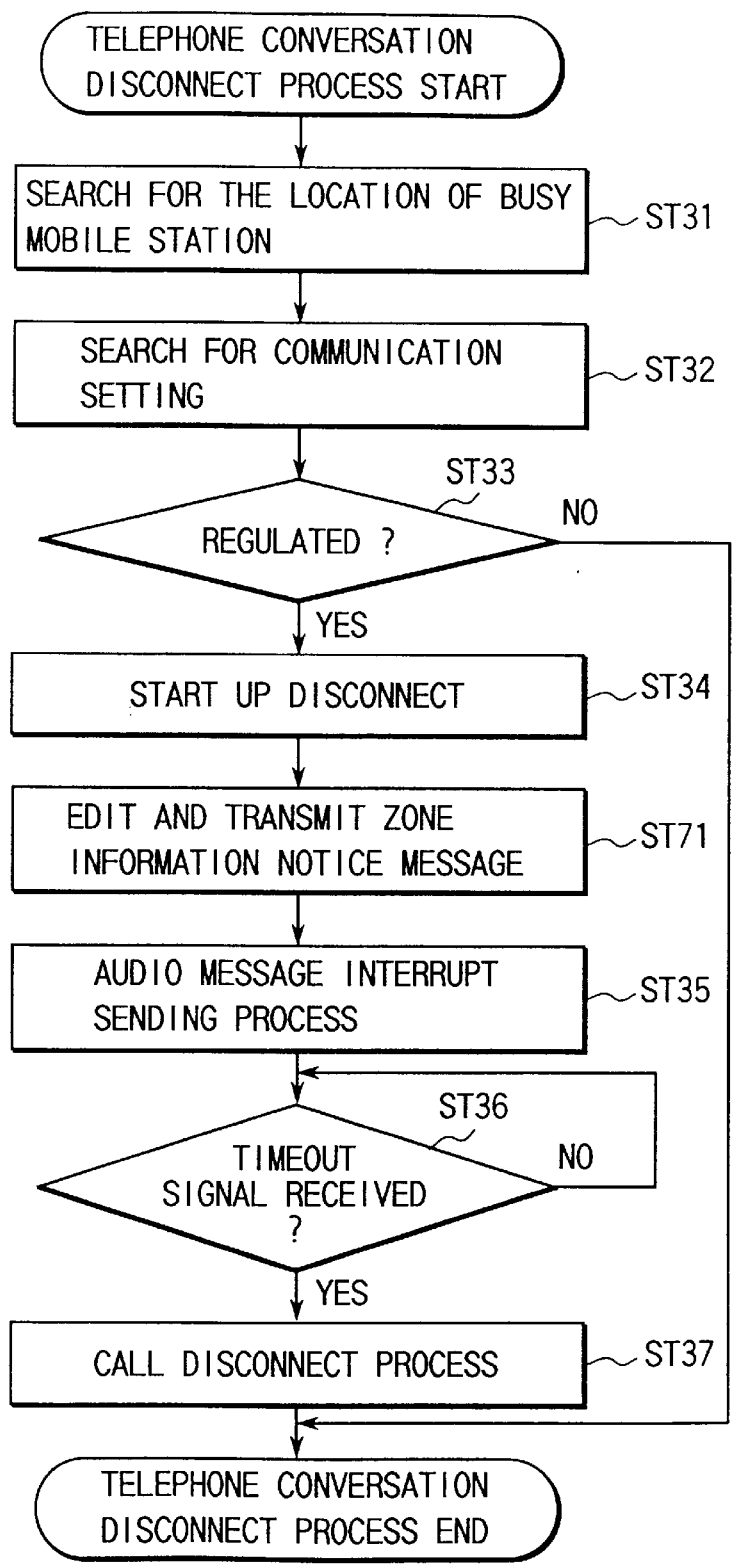
F I G. 19

| STATE / RADIO ZONE NAME | CALL ORIGINATING | CALL TERMINATING | BUSY | HANDOVER |
|---|---|---|---|---|
| Z-1 | PERMITTED | PERMITTED | PERMITTED | PERMITTED |
| Z-2 | REGULATED | REGULATED | PERMITTED | PERMITTED |
| Z-3 | REGULATED | REGULATED | REGULATED | REGULATED |
| Z-4 | PERMITTED | PERMITTED | PERMITTED | PERMITTED |
| Z-5 | REGULATED | REGULATED | REGULATED | REGULATED |
| Z-6 | PERMITTED | PERMITTED | PERMITTED | PERMITTED |

FIG. 20

| TYPE OF MOBILE STATION | TELEPHONE MOBILE STATION | | | | DATA MOBILE STATION | | | |
|---|---|---|---|---|---|---|---|---|
| STATE / RADIO ZONE NAME | CALL ORIGINATING | CALL TERMINATING | BUSY | HANDOVER | CALL ORIGINATING | CALL TERMINATING | BUSY | HANDOVER |
| Z-1 | PERMITTED | PERMITTED | PERMITTED | PERMITTED | PERMITTED | PERMITTED | PERMITTED | PERMITTED |
| Z-2 | PERMITTED | PERMITTED | PERMITTED | PERMITTED | PERMITTED | PERMITTED | PERMITTED | PERMITTED |
| Z-3 | REGULATED | REGULATED | REGULATED | REGULATED | REGULATED | REGULATED | REGULATED | REGULATED |
| Z-4 | PERMITTED | REGULATED | REGULATED | REGULATED | REGULATED | REGULATED | REGULATED | REGULATED |
| Z-5 | REGULATED | REGULATED | PERMITTED | PERMITTED | PERMITTED | PERMITTED | PERMITTED | PERMITTED |
| Z-6 | PERMITTED | PERMITTED | PERMITTED | PERMITTED | PERMITTED | PERMITTED | PERMITTED | PERMITTED |

F I G. 21

COMMUNICATION CONTROL APPARATUS FOR PROVIDING MANAGEMENT AND CALL CONTROL OF MOBILE STATIONS IN RADIO COMMUNICATION SYSTEM

BACKGROUND OF THE INVENTION

This invention relates to a communication control apparatus that enables mobile radio communication by providing management and call control of mobile stations.

With the recent advances in communication technology and expansion of communication needs, various mobile radio communication systems have been developed. One of them is a digital cordless telephone system, known as a PHS (Personal Handyphone System), which has been put to practical use in Japan.

The digital cordless telephone system have been widely used to enable mobile radio communication in recreation facilities (e.g., sports stadiums, amusement parks, theme parks, or event sites), public facilities (e.g., large-scale parks, railroad stations, or public offices), or private facilities (e.g., hotels or department stores).

To enable mobile radio communication in such specific facilities, radio base stations are provided in various places in the facilities. In addition, there is provided a communication control apparatus that provides call control of mobile stations via the radio base stations.

The digital cordless telephone system enables the users to make telephone conversations wherever they want to. To do this, the mobile stations are designed to make an originating call or a terminating call, or to enable telephone conversation, as long as they are in the state where they can communicate with the radio base stations.

Consequently, even in the circumstances where telephone conversations would give the people around the user annoyance, such as at the seats in a movie theater where a film is now in progress, it is possible to make a phone call. In such circumstances, the users of the mobile stations are requested to refrain from making telephone conversations, but it is impossible to prevent telephone conversations completely.

BRIEF SUMMARY OF THE INVENTION

It is, accordingly, an object of the present invention to overcome the above-described disadvantage by providing a communication control apparatus capable of limiting telephone conversations according to the situation of a service area of mobile radio communication service.

The foregoing object is accomplished by providing a communication control apparatus comprising: first storage means for storing the communication permit/inhibit information that indicates whether or not the mobile stations located in the radio zone are permitted to communicate for each of the specific radio zones set for each of the communication areas or for a set of some of the communication areas; and call processing means that, when a call request related to a mobile station located in the service area has been made, judges whether or not communication is permitted in the radio zone where the mobile station related to the call request is located, on the basis of the communication permit/inhibit information stored in the first storage means, and that carries out the call process corresponding to the call request only when communication is permitted, and that disconnects the call related to the mobile station when the communication permit/inhibit information stored in the first storage means has been changed and a busy mobile station is located in the radio zone where communication is inhibited by the changed communication permit/inhibit information.

Additional object and advantages of the invention will be set forth in the description which follows, and in part will be obvious from the description, or may be learned by practice of the invention. The object and advantages of the invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 2 is a block diagram schematically showing the relationship between various functions that the CPU 15 of FIG. 1 realizes;

FIG. 3 shows an example of how the service area managed by the communication control apparatus 1 of FIG. 1 are formed;

FIG. 4 shows an example of the purpose of use of each radio zone in the service area of FIG. 3;

FIG. 5 shows an example of a schedule for holding an event in a multipurpose hall in the service area of FIG. 3;

FIG. 6 shows an example of the pieces of pattern candidate information stored in the communication setting pattern recording memory 173 of FIG. 1;

FIG. 7 shows an example of the pieces of pattern schedule information stored in the communication setting pattern recording memory 173 of FIG. 1;

FIG. 12 is a flowchart of the procedure for the conversation interruption process performed by the call control section 153 of FIG. 2;

FIG. 14 is a block diagram schematically showing the relationship between various functions that the CPU 71 of FIG. 13 realizes;

FIG. 15 is a flowchart of the procedure for the settings changing process performed by the call control section 711 and the communication settings setting section 712 of FIG. 14;

FIG. 17 is a block diagram schematically showing the relationship between various functions that the CPU 81 of FIG. 16 realizes;

FIG. 18 is a flowchart of the procedure for the system information notice message changing process performed by the radio control section 812 of FIG. 17;

FIG. 19 is a flowchart of the procedure for the conversation interruption process performed by the call control section 811;

FIG. 20 shows a modification of the communication setting pattern stored in the communication setting memory 172; and FIG. 21 shows a modification of the communication setting pattern stored in the communication setting memory 172.

DETAILED DESCRIPTION OF THE INVENTION (First Embodiment)

Hereinafter, referring to the accompanying drawings, a first embodiment of the present invention will be explained.

Figure 1:
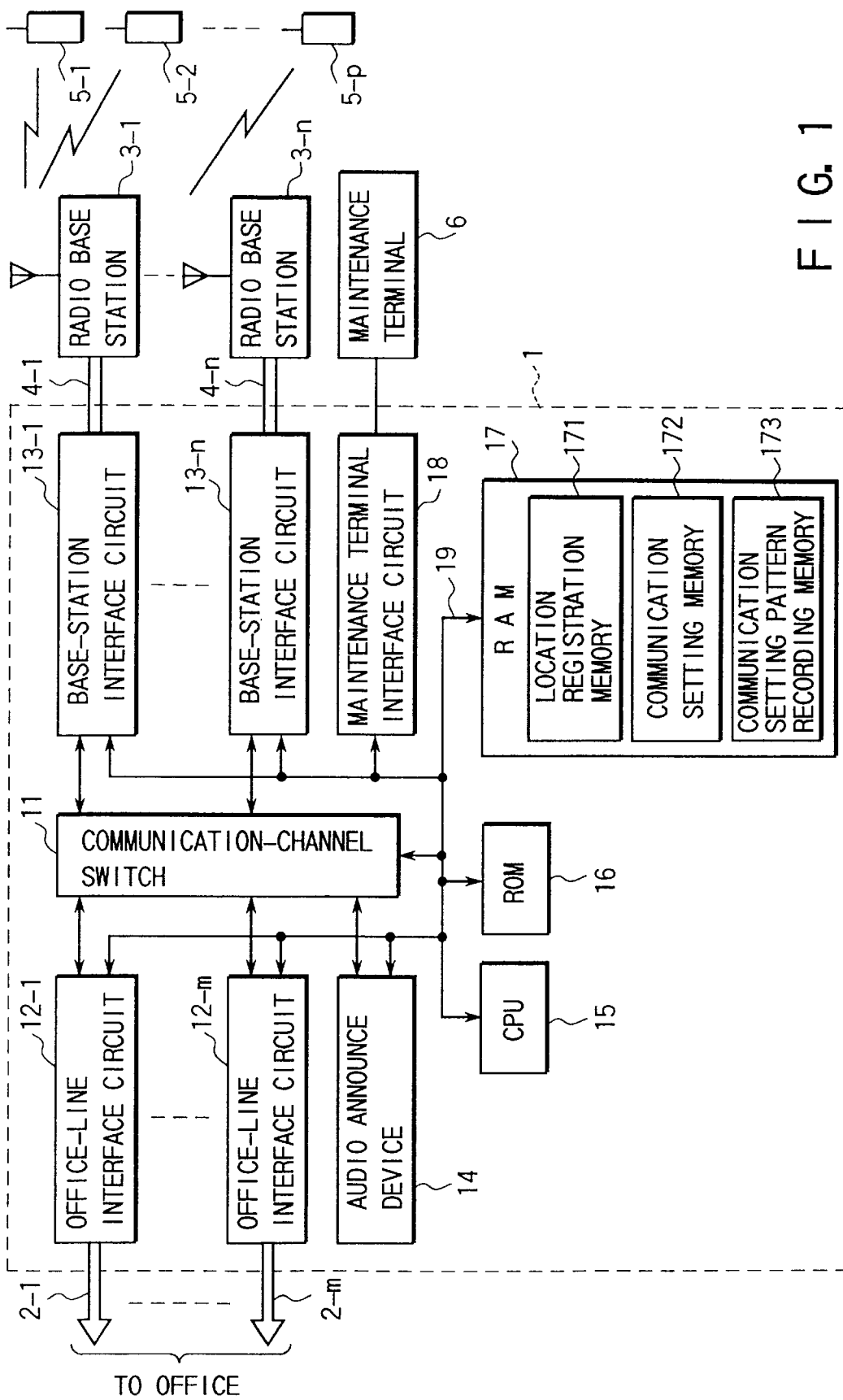
FIG. 1 is a block diagram of the configuration of a communication control apparatus according to a first embodiment of the present invention.

FIG. 1 is a block diagram of the configuration of a communication control apparatus according to an embodiment of the present invention.

In the figure, reference numeral 1 indicates a communication control apparatus. The communication control apparatus 1 is connected to offices (not shown) of a communication network via a plurality of (an m number of) office lines 2 (2-1 to 2-m) and accommodates a plurality of (an n number of) radio base stations 3 (3-1 to 3-n) distributed in a specific service area (e.g., within specific facilities) via communication channels 4 (4-1 to 4-n), respectively. The communication control apparatus 1 manages a plurality of mobile stations 5 (5-1 to 5-p), such as cordless telephones, located in the communication area of each of the radio base stations 3 and performs call control between mobile stations 5 or between terminals connected via office lines and mobile stations 5, as the need arises.

The radio base stations 3 and mobile stations 5 are connected to each other via radio channels. The four-channel multiplex multicarrier TDMA (Time Division Multiple Access)-TDD (Time Division Duplex) scheme or the like is used for the method of accessing the radio channels.

The communication control apparatus 1 comprises a communication-channel switch 11, a plurality of (an m number of) office line interface circuits 12 (12-1 to 12-m), a plurality of (an n number of) base station interface circuits 13 (13-1 to 13-n), an audio announce device 14, a CPU 15, a ROM 16, a RAM 17, and a maintenance terminal interface circuit 18. These component parts are connected to each other via a bus 19. The office-line interface circuits 12-1 to 12-m, base-station interface circuits 13-1 to 13-n, and audio announce device 14 are connected to the communication-channel switch 11.

The communication-channel switch 11 exchanges each of the office-line interface circuits 12, base-station interface circuits 13, and audio announce device 14 under the control of the CPU 15.

The office lines 2 are connected to the office-line interface circuits 12, respectively. Each of the office-line interface circuits 12 has the function of taking in the call control signal given from an office via an office line 2, protocol-converting the signal, and supplying the resulting signal to the CPU 15, the function of protocol-converting the call control signal outputted from the CPU 15 and sending the resulting signal to the office line 2 to supply it to the office, and the function of transmitting and receiving the speech signal.

The radio base stations 3 are connected to the base-station interface circuit 13 via communication channels, respectively. Each of the base-station interface circuits 13 has the function of taking in a call control signal and terminal management signal given from a radio base station 3 via a communication channel 4, protocol-converting the signal, and supplying the resulting signal to the CPU 15, the function of protocol-converting the call control signal and terminal management signal outputted from the CPU 15, sending the resulting signal to the communication channel 14 to supply it to the radio base station 3, and the function of transmitting and receiving the speech signal.

The audio announce device 14 generates an audio message under the control of the CPU 15 to give it to the mobile stations 5 and the terminals connected to the device via the office lines 2 and sends the message to those terminals.

The CPU 15 operates according to the operation program stored in the ROM 16, thereby controlling each circuit in the communication control apparatus 1 and realizing the operation of the communication control apparatus.

The ROM 16 fixedly stores the operation program of the CPU 15 and the data necessary for the CPU 15 to control each circuit in the communication control apparatus 1.

The RAM 17 not only stores the data necessary for the CPU 15 to control each circuit in the communication control apparatus 1 in such a manner that the data can be rewritten, but also temporarily store the data created in controlling each circuit in the communication control apparatus 1. Part of the storage area of the RAM 17 is set in a location registration memory 171, a communication setting memory 172, and a communication setting pattern recording memory 173. The location registration memory 171 stores the location registration information which causes the terminal number of the mobile station 5 that has made a location registration request in the service area to correspond to the identification number of the radio zone to which the radio base station 3 that has accepted the location registration request belongs. The communication setting memory 172 stores only one communication setting pattern that shows an call permit/inhibit state in such a manner that the permission or inhibition corresponds to the communication area of each radio base station 3 or to each radio zone for which a set of communication areas of radio base stations 3 has been set. The communication setting pattern recording memory 173 stores the pattern candidate information created by assigning a pattern number to each of a plurality of communication setting patterns. The communication setting pattern recording memory 173 also stores the pattern schedule information that indicates the pattern numbers so as to correspond to the times at which the setting of the communication setting patterns is to be changed.

A maintenance terminal 6 is connected to the maintenance terminal interface circuit 18. The maintenance terminal interface circuit 18 not only takes in various maintenance process requests from the maintenance terminal 6 and gives them to the CPU 15, but also gives to the maintenance terminal 6 various pieces of information outputted from the CPU 15. The maintenance terminal is composed of, for example, a personal computer.

The CPU 15 realizes various functions by operating according to the operation program stored in the ROM 16. FIG. 2 is a functional block diagram schematically showing the relationship between various functions that the CPU 15 realizes.

As shown in the figure, the functions the CPU 15 realizes include a mobile station management section 151, a mobile station location registration section 152, a call control section 153, a mobile station location searching section 154, a communication setting searching section 155, a communication settings setting section 156, and a communication setting pattern registration section 157.

The mobile station management section 151 manages the mobile stations 5 located in the service area. When receiving via the bus 19 from the base-station interface section 13 the location registration information created at the radio base station 3 on the basis of the location registration request transmitted from the mobile station 5, the mobile station management section 151 supplies the location registration information to the mobile station location registration section 152. The mobile station location registration section 152 stores in the location registration memory 171 the location registration information given from the mobile station management section 151.

The call control section 153 controls the connection of originating and terminating calls and busy calls and manages the states of calls. When controlling the connection of a call related to a mobile station 5, the call control section 153 inquires of the mobile station location searching section 154 about the location of the related mobile station 5. In response to the inquiry made by the call control section 153, the mobile station location searching section 154 determines the location (radio zone) in which the mobile station 5 specified in the inquiry and informs the call control section 153 of the location. The mobile station location searching section 154 determines the location in which the mobile station 5 has been registered by searching the location registration memory 171 using the station number of the specified mobile station 5 as a key.

The call control section 153, when controlling the connection of a call related to a mobile station 5, inquires of the communication setting searching section 155 whether or not the related mobile station 5 can make a telephone call. In response to the inquiry made by the call control section 153, the communication setting searching section 155 judges whether or not the mobile station 5 specified in the inquiry is permitted to make a telephone call and informs the call control section 153 of the result. The communication setting searching section 155 judges whether or not the mobile station 5 is permitted to make a telephone call by searching the communication setting memory 172 using as a key the radio zone in which the specified mobile station 5 is present.

The communication settings setting section 156 has a time counting function. When the time has been reached which is specified by the pattern schedule information stored in the communication setting pattern recording memory 173, the communication settings setting section takes the communication setting pattern corresponding to the time out of the communication setting pattern recording memory 173 and replaces the communication setting pattern stored in the communication setting memory 172 with the communication setting pattern taken out of the communication setting pattern recording memory 173.

When having been given a pattern candidate information update request or a pattern schedule information update request made by the maintenance terminal 6 via the maintenance terminal interface section 18 and bus 19, the communication pattern registration section 157 updates the pattern candidate information or pattern schedule information stored in the communication setting pattern recording memory 173 according to the contents of the request.

Next, the operation of the communication control apparatus 1 thus constructed will be explained. Here, it is assumed that the inside of recreation facilities 21 is a service area and a mobile radio communication system has nine radio base stations 3 (3-1 to 3-9) arranged in the service area as shown in FIG. 3. The communication area of each radio base station 3 is determined to be a radio zone. The identification names of the individual radio zones (radio zone names) are Z-1, Z-2, . . . , Z-9 in ascending order, starting with the zone corresponding to the communication area of the radio base station 3-1.

Suppose the purpose of use of each radio zone is determined as shown in FIG. 4. Specifically, the radio zones Z-1 to Z-4 and Z-6 are for recreation facilities, the radio zones Z-5, Z-8, and Z-9 are for entrance, exit, and public square, and the radio zone Z-7 is for multipurpose hall.

A schedule for holding an event in the multi-purpose hall is shown in FIG. 5. It is assumed that telephone conversations must be regulated during a lecture.

Under the above conditions, telephone conversations may be allowed throughout the day in the radio zones except for radio zone Z-7 corresponding to the multipurpose hall, but in radio zone Z-7, switching must be done between the permission and inhibition of telephone conversation, depending on whether a lecture is in progress or not. Namely, two states can be considered: a first state where telephone conversations are allowed in all of the radio zones and a second state where telephone conversations are inhibited only in radio zone Z-7. For example, the manager of the system creates pattern candidate information in advance by assigning pattern number "1" to communication setting patterns presenting the first state and pattern number "2" to communication setting patterns presenting the second state as shown in FIG. 6 and registers the information in the communication setting pattern recording memory 173. Furthermore, for example, the manager of the system creates the pattern schedule information in advance that causes pattern number "2" to correspond to the start time of a lecture and pattern number "1" to correspond to the end time of the lecture and registers the information in the communication setting pattern recording memory 173.

Figures 8, 9:
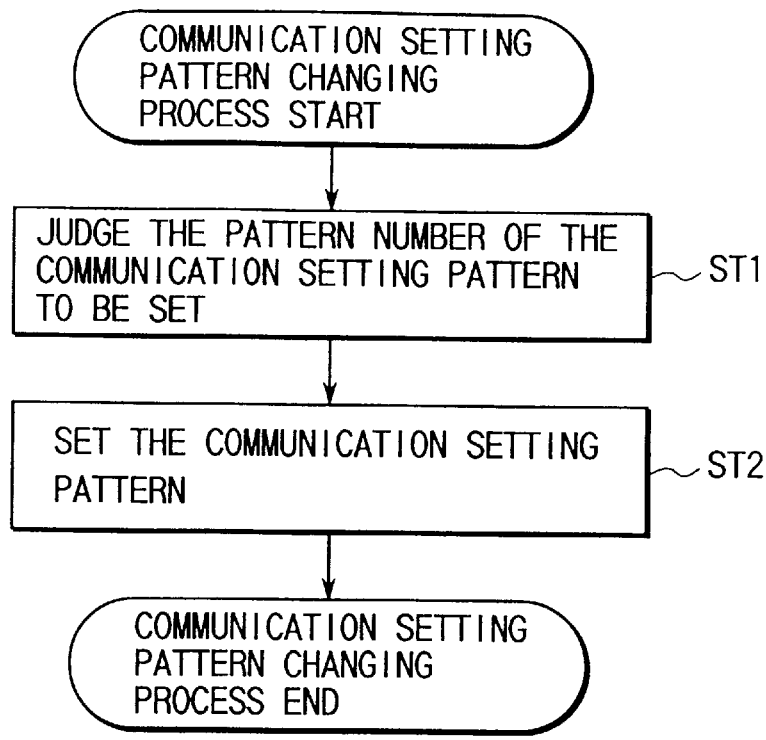
FIG. 8 is a flowchart of the procedure for the communication setting pattern change setting process performed by the communication settings setting section 156 of FIG. 2.
FIG. 9 shows an example of the communication setting pattern stored in the communication setting memory 172 of FIG. 1.

With the above settings, when the set time shown in the pattern schedule information has been reached, the communication settings setting section 156 in the CPU 15 starts the communication setting pattern change setting process shown in FIG. 8. In the communication setting pattern change setting process, the communication settings setting section 156 reads the pattern number corresponding to the time from the pattern schedule information and determines the pattern number to be the pattern number of the communication setting pattern to be set (step ST1). Then, the communication settings setting section 156 reads the communication setting pattern assigned the determined pattern number from the pattern candidate information and stores it in the communication setting memory 172 (step ST2). Specifically, when it is ten o'clock, because the pattern number corresponding to the time is "2," the communication setting pattern assigned the pattern number "2" is stored in the communication setting memory 172. As a result, the contents of the communication setting memory 172 is as shown in FIG. 9.

When the maintenance terminal 6 has requested the communication setting pattern stored in the communication setting memory 172 to be updated and the call control section 153 has informed the communication settings setting section 156 of the fact, the communication settings setting section will be able to update the communication setting pattern stored in the communication setting memory 172 according to the request.

Next, explanation will be given about a case where a mobile station 5 existing in the service area of the communication control apparatus 1 has sent a call setting request signal to request call originating.

Figure 10:
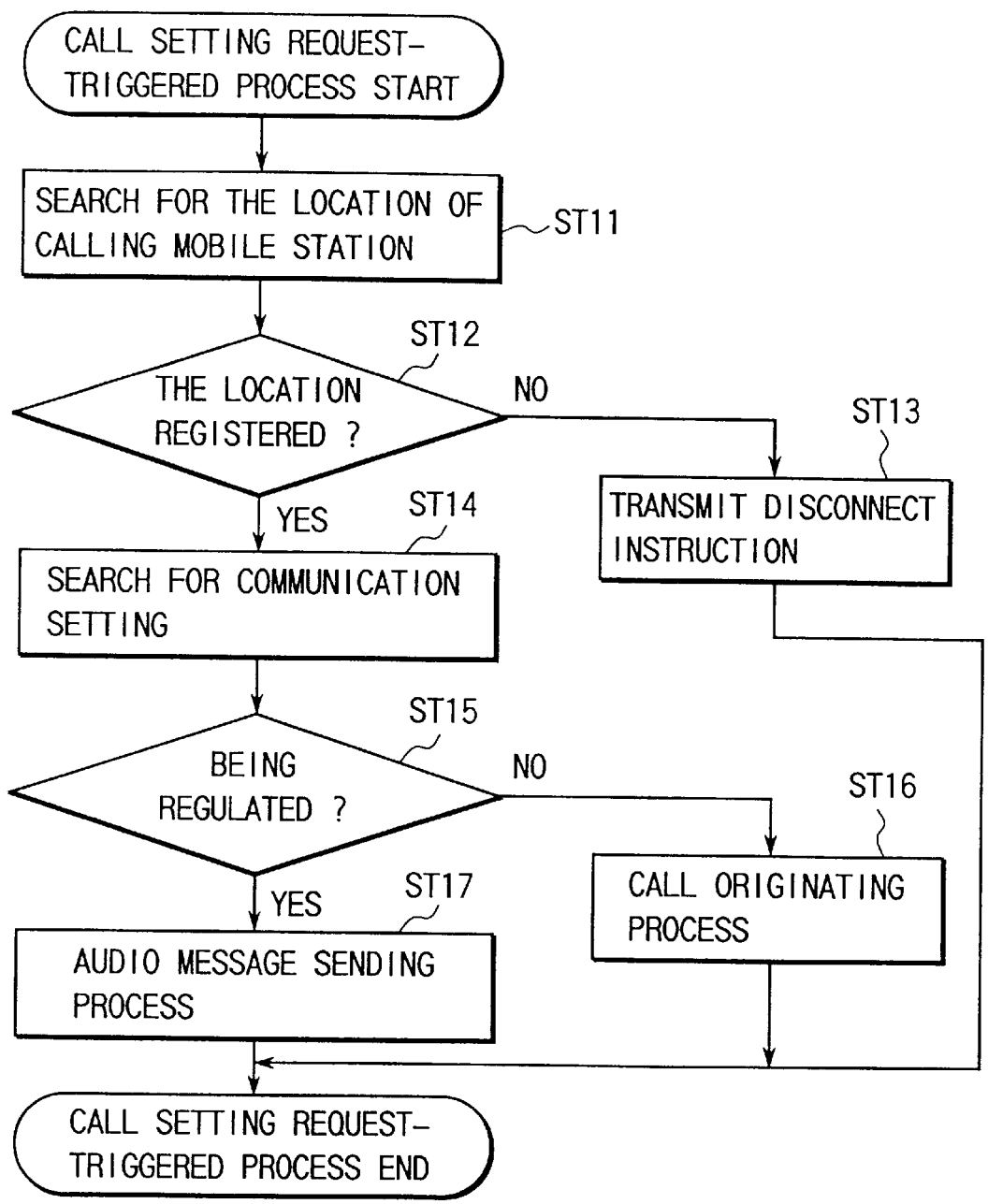
FIG. 10 is a flowchart of the procedure for the call setting request process performed by the call control section 153 of FIG. 2.

When a mobile station 5 has sent a call setting request signal, the radio base station 3 capable of communicating with the mobile station 5 receives the call setting request signal. The call setting request signal is supplied from the radio base station 3 to the CPU 15 via the communication line 4, base-station interface circuit 13, and bus 19. Then, in response to the call setting request signal, the call control section 153 in the CPU 15 executes the call setting request-triggered process as shown in FIG. 10.

Specifically, the call control section 153 causes the mobile station location searching section 154 to search for the location of the mobile station 5 (hereinafter, referred to as the calling station) that has sent the call setting request signal (step ST11). In response to this, the mobile station location searching section 154 searches the location registration memory 171 for the location registration information on the calling station and when finding the relevant location registration information, gives the location registration information to the call control section 153.

On the basis of the response from the mobile station location searching section 154, the call control section 153 judges whether or not the location of the calling station has been registered (step ST12). If the location registration information on the calling station has not been given from the mobile station location searching section 154, the call control section 153 will judge that the location of the calling station has not been registered. Then, the call control section 153 will send a disconnect instruction signal to the calling station (step ST13), which will terminate the call setting request-triggered process. In contrast, when the location registration information on the calling station has been given from the mobile station location searching section 154, the call control section 153 will judge that the location of the calling station has been registered. Then, the call control section 153 will cause the communication setting searching section 155 to search for the communication setting regarding the radio zone in which the calling station exists (step ST14). In response to this, the communication setting searching section 155 searches the communication setting memory 172 using the identification number of the radio zone specified in the location registration information on the calling station as a key and informs the call control section 153 of the thus obtained communication setting.

On the basis of the notice from the communication setting searching section 155, the call control section 153 judges whether or not telephone conversations are inhibited in the radio zone in which the calling station exists (step ST15). If telephone conversations are permitted in the radio zone in which the calling station exists, the call control section 153 will perform the calling process as usual (step ST16). The call originating process includes the following processes: dial analysis, outgoing line acquisition, the sending of a call setting request to an office (in call originating via the office), and the generation of a call terminating request signal to itself (in calling a mobile station 5). In contrast, when telephone conversations are inhibited in the radio zone in which the calling station exists, the call control section 153 will not perform the call originating process at step ST16. Then, the call control section 153 performs the audio message sending process (step ST17). The audio message sending process is the process of connecting the audio announce device 14 to the calling station and causing the audio announce device 14 to send the audio message "Call originating cannot be effected at present in this radio zone."

Then, after the process at step ST16 or step ST17 has been completed, the call control section 153 terminates the call setting request-triggered process.

Next, explanation will be given about a case where the call terminating request signal sent from the office has arrived and a case where a call terminating request signal has been generated in the call originating process at step ST16 in the call setting request process.

Figure 11:
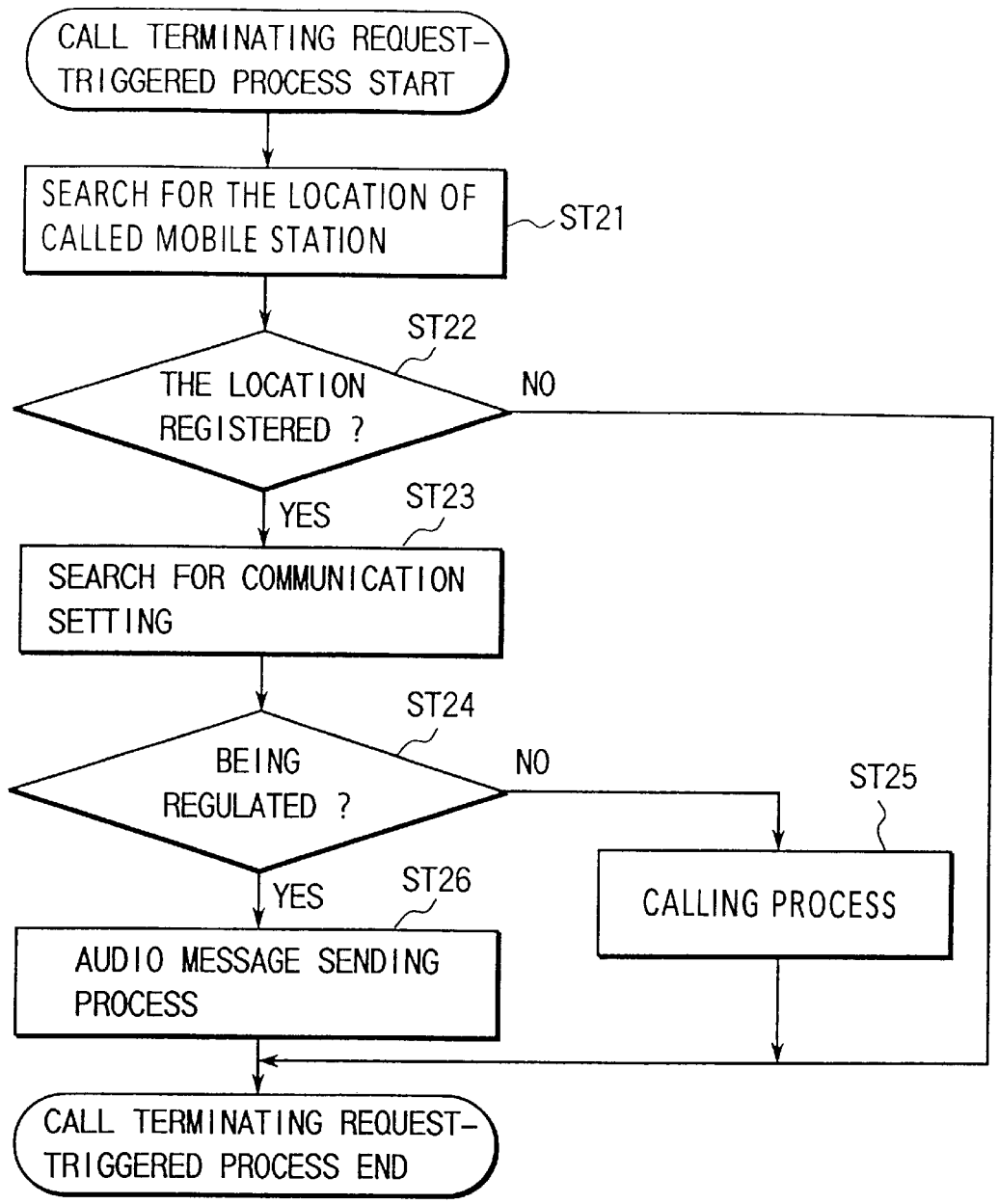
FIG. 11 is a flowchart of the procedure for the call incoming request process performed by the call control section 153 of FIG. 2.

When the call terminating request signal sent from the office has arrived via the office line 2, the call terminating request signal is given to the CPU 15 via the office-line interface circuit 12 and bus 19. In response to the call terminating request signal, the call control section 153 in the CPU 15 executes the terminating request-triggered process as shown in FIG. 11.

Specifically, the call control section 153 causes the mobile station location searching section 154 to search for the location of the mobile station 5 (hereinafter, the called station) specified for the called party by the call terminating request signal (step ST21). In response to this, the mobile station location searching section 154 searches the location registration memory 171 for the location registration information on the called station. When having found the relevant location registration information, the mobile station location searching section 154 gives the location registration information to the call control section 153.

On the basis of the response from the mobile station location searching section 154, the call control section 153 judges whether or not the location of the called station has been registered (step ST22). If the location registration information on the called station has not given from the mobile station location searching section 154, the call control section 153 will judge that the location of the called station has not been registered and then complete the call setting request-triggered process. In contrast, when the location registration information on the called station has been given from the mobile station location searching section 154, the call control section 153 will judge that the location of the called station has been registered. Then, the call control section 153 will causes the communication setting searching section 155 to search for the communication setting regarding the radio zone in which the called station exists (step ST23). In response to this, the communication setting searching section 155 searches the communication setting memory 172 using the identification number of the radio zone specified in the location registration information on the called station and informs the call control section 153 of the thus obtained communication setting.

On the basis of the notice from the communication setting searching section 155, the call control section 153 judges whether or not telephone conversations are permitted in the radio zone in which the called station exists (step ST24). If telephone conversations are allowed in the radio zone in which the called station exists, the call control section 153 performs the called party calling process as usual (step ST25). In contrast, when telephone conversations are inhibited in the radio zone in which the called station exists, the call control section 153 does not perform the calling process at step ST25. Instead, the call control section 153 performs the audio message sending process (step ST26). The audio message sending process is the process of connecting the audio announce device 14 to the calling terminal and causing the audio announce device 14 to send the audio message "The number you just dialed is now unavailable."

After the process at step ST25 or step ST26 has been completed, the call control section 153 terminates the terminating request process.

Next, explanation will be given about a case where the changing of the communication setting pattern is effected with telephone conversation being in progress on a mobile station 5 the communication control apparatus 1 has accommodated and about a case where a handover process is performed on a mobile station 5 the communication control apparatus 1 has accommodated.

When the setting time specified in the pattern schedule information has arrived, the communication settings setting section 156 changes the communication setting pattern as described above. When having finished changing the communication setting pattern, the communication settings setting section 156 gives the pattern change complete signal to the call control section 153. When having completed changing the handover process related to the mobile station 5, the call control section 153 internally generates a handover complete signal. Then, the call control section 153, receiving the pattern change complete signal or handover complete signal, executes the communication interruption process as shown in FIG. 12.

Specifically, the call control section 153 first causes the mobile station location searching section 154 to search for the location of the mobile station on which telephone conversations are in progress (hereinafter, referred to as the busy station) (step ST31). In response to this, the mobile station location searching section 154 searches the location registration memory 171 for the location registration information on the busy station. When having found the relevant location registration information, the mobile station location searching section gives the location registration information to the call control section 153.

On the basis of the response from the mobile station location searching section 154, the call control section 153 determines the radio zone in which the busy station exists and causes the communication setting searching section 155 to search for the communication setting on the radio zone (step ST32). In response to this, the communication setting searching section 155 searches the communication setting memory 172 using the identification number of the radio zone specified in the location registration information on the called station as a key and informs the call control section 153 of the thus obtained communication setting.

On the basis of the notice from the communication setting searching section 155, the call control section 153 judges whether or not telephone conversations are inhibited in the radio zone in which the called station exists (step ST33). If telephone conversations are permitted in the radio zone in which the called station exists, the call control section 153 will terminate the during-conversation disconnect process without disconnecting the call made by the mobile station 5. In contrast, when telephone conversations are inhibited in the radio zone in which the busy station exists, the call control section 153 starts up the built-in disconnect timer (step ST34). The disconnect timer counts up a specific allowable time (e.g., 30 seconds). Then, the call control section 153 carries out an audio message interrupt transmission process (step ST35). The audio message interrupt transmission process is the process of controlling the speech path switch 11 to connect the audio announce device 14 to the link of the busy station and causing the audio announce device 14 to send, for example, the audio message "Telephone conversations are now being regulated in this radio zone. You will be automatically disconnected 30 seconds later."

After this, the call control section 153 waits for the disconnect timer to internally output a time-out signal (step ST36). When the disconnect timer has finished counting the allowable time and outputted a time-out signal, the call control section 153 disconnects the call made by the busy station and forcibly terminates the telephone conversation (step ST37).

After the process at step ST37 has been completed, the call control section 153 has terminated the conversation disconnect process. When the conversation disconnect process is executed according to the change of the communication setting pattern, the above-described process will be performed on all of the mobile stations 5 that are busy at the time when the communication setting pattern is changed.

As described above, with the present embodiment, telephone conversations on the mobile stations 5 can be regulated radio zone by radio zone. Consequently, it is possible to provide telephone service in areas where telephone conversations cause no problem, such as an entrance, an exit, a public square, or recreation facilities, while inhibiting telephone conversations in some areas where telephone conversations are undesirable, such as a multipurpose hall in recreation facilities.

Furthermore, with the present embodiment, because whether or not telephone conversations are inhibited can be set for each single radio zone, it is possible to selectively set the permission or inhibition of telephone conversation according to how the facilities corresponding to the radio zones are used. Therefore, it is possible to provide elaborate telephone service by inhibiting telephone conversations only during a lecture in the multipurpose hall as described above.

Still furthermore, with the embodiment, because the telephone conversation regulation effecting pattern is automatically changed according to the preset pattern schedule information, when the time zone that telephone conversations are to be regulated is defined, presetting the pattern schedule information saves the manager a lot of time and labor and assures the switching between the enforcement and cancellation of the regulation of telephone conversations.

(Second Embodiment)

Figure 13:
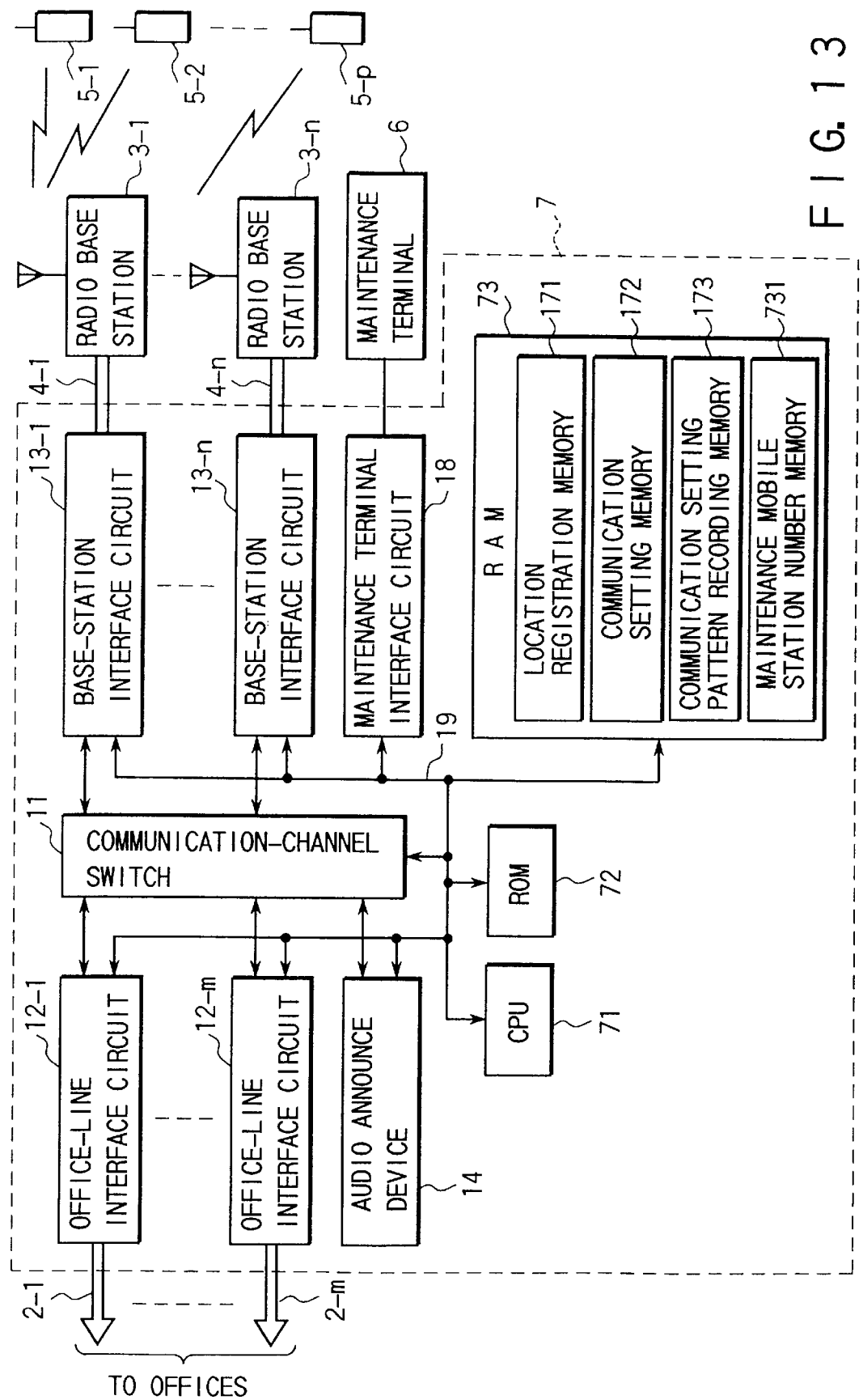
FIG. 13 is a block diagram of the configuration of a communication control apparatus according to a second embodiment of the present invention.

FIG. 13 is a block diagram of the configuration of a communication control apparatus according to a second embodiment of the present invention. In FIG. 13, the same parts as those of FIG. 1 are indicated by the same reference symbols and a detailed explanation of them will not be given.

In FIG. 13, reference numeral 7 indicates a communication control apparatus. The communication control apparatus 7 is connected to offices (not shown) of a communication network via a plurality of (an m number of) office lines 2 (2-1 to 2-m) and accommodates a plurality of (an n number of) radio base stations 3 (3-1 to 3-n) distributed in a specific service area (e.g., within specific facilities) via communication channels 4 (4-1 to 4-n), respectively. The communication control apparatus 7 manages a plurality of mobile stations 5 (5-1 to 5-p), such as cordless telephones, located in the communication area of each of the radio base stations 3 and performs call control between mobile stations 5 or between terminals connected via office lines 2 and mobile stations 5, as the need arises.

The radio base stations 3 and mobile stations 5 are connected to each other via radio channels. The four-channel multiplex multicarrier TDMA (Time Division Multiple Access)-TDD (Time Division Duplex) scheme or the like is used for the method of accessing the radio channels.

The communication control apparatus 7 comprises a communication-channel switch 11, a plurality of (an m number of) office-line interface circuits 12 (12-1 to 12-m), a plurality of (an n number of) base-station interface circuits 13 (13-1 to 13-n), an audio announce device 14, a maintenance terminal interface circuit 18, a CPU 71, a ROM 72, and a RAM 73. These component parts are connected to each other via a bus 19. The office-line interface circuits 12-1 to 12-m, base-station interface circuits 13-1 to 13-n, and audio announce device 14 are connected to the communication-channel switch 11.

Namely, the communication control apparatus 7 of the second embodiment has the same configuration as that of the communication control apparatus 1 of the first embodiment except that the CPU 71, ROM 72, and RAM 73 are provided in place of the CPU 15, ROM 16, and RAM 17.

The CPU 71 operates according to the operation program stored in the ROM 72, thereby controlling each circuit in the communication control apparatus 7 and realizing the operation of the communication control apparatus.

The ROM 72 fixedly stores the operation program of the CPU 71 and the data necessary for the CPU 71 to control each circuit in the communication control apparatus 7.

The RAM 73 not only stores the data necessary for the CPU 71 to control each circuit in the communication control apparatus 7 in such a manner that the data can be rewritten, but also temporarily store the data created in controlling each circuit in the communication control apparatus 7. Part of the storage area of the RAM 73 is set in a location registration memory 171, a communication setting memory 172, a communication setting pattern recording memory 173, and a maintenance mobile station number memory 731. That is, the RAM 73 is the same as the RAM 17 of the first embodiment except that the maintenance mobile station number memory 731 is added. The maintenance mobile station number memory 731 is used to store the identification number of a mobile station 5 to give maintenance instruction.

The CPU 71 realizes various functions by operating according to the operation program stored in the ROM 72. FIG. 14 is a functional block diagram schematically showing the relationship between various functions that the CPU 71 realizes.

As shown in the figure, the functions the CPU 71 realizes include a mobile station management section 151, a mobile station location registration section 152, a mobile station location searching section 154, a communication setting searching section 155, a communication setting pattern registration section 157, a call control section 711, and a communication settings setting section 712.

Namely, the functions the CPU 71 realizes are almost the same as those the CPU 15 of the first embodiment realizes except that the call control section 711 and communication settings setting section 712 are realized instead of the call control section 153 and communication settings setting section 156.

The call control section 711 has not only the function the call control section 153 of the first embodiment has, but also the function of instructing the communication settings setting section 712 to perform the process of updating the communication setting pattern when a mobile station 5 has made a specific service code call.

The communication settings setting section 712 has not only the function that the communication settings setting section 156 of the first embodiment has, but also the function of updating the communication setting pattern according to the instruction from the call control section 711. In updating the communication setting pattern, the communication settings setting section 712 determines whether or not the mobile station 5 that has made a special service code call is a mobile station set for maintenance (hereinafter, referred to as a maintenance mobile station) by referring to the maintenance mobile station number memory 731.

Next, the operation of the communication control apparatus 7 thus constructed will be explained.

The call control section 711 and communication settings setting section 712 execute the various processes executed by the call control section 153 and communication settings setting section 156 of the first embodiment in a similar manner. In addition to this, the call control section 711 and communication settings setting section 712 execute the following processes.

When a mobile station 5 existing in the service area of the communication control apparatus 7 gives a call originating instruction with a specific special service code in order to specify the update of the communication setting pattern and a call setting request signal specifying the special service code is sent, a radio base station 3 that can communicate with the mobile station 5 receives the call setting request signal. The call setting request signal is supplied from the radio base station 3 to the CPU 71 via the communication line 4, base-station interface circuit 13, and bus 19. Then, in response to the call setting request signal specifying the special service code, the call control section 711 in the CPU 71 executes the setting update process as shown in FIG. 15.

Specifically, the call control section 711 first causes the mobile station location searching section 154 to search for the location of the mobile station 5 that has sent the call setting request signal (hereinafter, referred to as the instruction station) (step ST41). In response to this, the mobile station location searching section 154 searches the location registration memory 171 for the location registration information on the specifying station. When having found the relevant location registration information, the mobile station location searching section will give the location registration information to the call control section 711.

On the basis of the response from the mobile station location searching section 154, the call control section 711 judges whether or not the location of the instruction mobile station has been registered (step ST42). If the location registration information on the instruction mobile station has not been given from the mobile station location searching section 154, the call control section 711 will judge that the location of the instruction mobile station has not been registered. Then, the call control section 711 will send a disconnect instruction signal to the instruction mobile station (step ST43) and terminate the setting update process. In contrast, when the location registration on the instruction mobile station has been given from the mobile station location searching section 154, the call control section 711 will judge that the location of the instruction mobile station has been registered. Then, the call control section 711 will inform the communication settings setting section 712 of the location of the instruction. mobile station, the identification number of the instruction mobile station, and the type of update of the communication setting pattern (step ST44).

In response to the notice from the call control section 711, the communication settings setting section 712 executes the setting update process as shown in FIG. 15.

Specifically, the communication settings setting section 712 searches the maintenance mobile station number memory 731 for the identification number of the instruction mobile station sent from the call control section 711 (step ST51). On the basis of the search result, the communication settings setting section 712 judges whether or not the instruction mobile station has been set for maintenance, depending on whether the relevant identification number has been stored in the maintenance mobile station number memory 731 (step ST52). If the instruction mobile station has not been set for maintenance, the communication settings setting section 712 will invalidate the current instruction to update the communication setting pattern and notify the call control section 711 of refusal (step ST53) and terminate the setting update process. In contrast, when the instruction mobile station has been set for maintenance, the communication settings setting section 712 will execute the setting update process (step ST54).

The setting update process is the process of updating the communication setting pattern stored in the communication setting memory 172 according to the update instruction. There are two methods of updating the communication setting pattern: one method updates the communication setting pattern zone by zone and the other method updates the communication setting pattern by changing the pattern. The former has two processes: inhibition setting and inhibition cancellation. Similarly, the latter has two processes: switching and cancellation. Special service codes have been set for these processes as follows:

Special service code "123-1": telephone conversations are inhibited in the radio zone to which the present location of the manager belongs Special service code "123-2": the inhibition of telephone conversations in the radio zone to which the present location of the manager belongs is canceled Special service code "124-1": the communication setting pattern is changed to another pattern Special service code "124-2": the present pattern is returned to the pattern specified by the pattern schedule information.

Therefore, when special service code "123-1" or special service code "123-2" has been specified in the setting update process, the communication settings setting section 712 updates the communication setting pattern stored in the communication setting memory 172 so that only the radio zone corresponding to the location of the instruction mobile station may be set for the inhibition of telephone conversations or the permission of telephone conversations. When special service code "124-1" have been specified in the setting update process, the communication settings setting section 712 reads a communication setting pattern different from the one currently stored in the communication setting memory 172 of the communication setting patterns stored in the communication setting pattern recording memory 173 and stores it in the communication setting memory 172. When special service code "124-2" has been specified in the setting update process, the communication settings setting section 712 reads the communication setting pattern specified in the pattern schedule information from the communication setting patterns stored in the communication setting pattern recording memory 173 and stores it in the communication setting memory 172.

After the above setting update process has been completed, the communication settings setting section 712 gives the call control section 711 an end notice (step ST55) and terminates the setting update process.

After receiving the notice of step ST44, the call control section 711 waits for the communication settings setting section 712 to give a refusal notice or an end notice (step ST45 or step ST46). When the communication settings setting section 712 has given a refusal notice as described earlier, the call control section 711 sends a disconnect instruction signal to the instruction terminal at step ST43 and terminates the setting update process. When the communication settings setting section 712 has given an end notice as described earlier, the call control section 711 performs the audio message sending process (step ST47) and then terminates the setting update process. The audio message sending process is the process of connecting the audio announce device 14 to the instruction station and causing the audio announce device 14 to send the following audio messages to give notice of the contents of the setting update process performed by the communication settings setting process 712:

When special service code "123-1" is specified: "Regulation is started"

When special service code "123-2" is specified: "Regulation is canceled"

When special service code "124-1" is specified: "Regulation pattern is changed from pattern 1 (2) to pattern 2 (1)"

When special service code "124-2" is specified: "Change is canceled"

Thus, with the second embodiment, the state of regulation enforcement can be changed according to the instruction given from a mobile station 5. With this feature, for example, when telephone conversations need to be regulated only during the period in which an irregular exhibition is held, telephone conversations can be regulated suitably by the person in charge in the site giving an instruction to update the communication setting pattern from the mobile station 5 at the beginning and end of the exhibition. That is, the communication control apparatus can be operated flexibly according to the actual conditions of the facilities.

Furthermore, with the second embodiment, because the communication setting pattern is updated according to only the instruction from the mobile station 5 set for maintenance, even if an ordinary user has dialed a special service call code for specifying the update of the communication setting pattern by mistake, the update of the communication setting pattern can be prevented in spite of the mistake.

(Third Embodiment)

Figure 16:
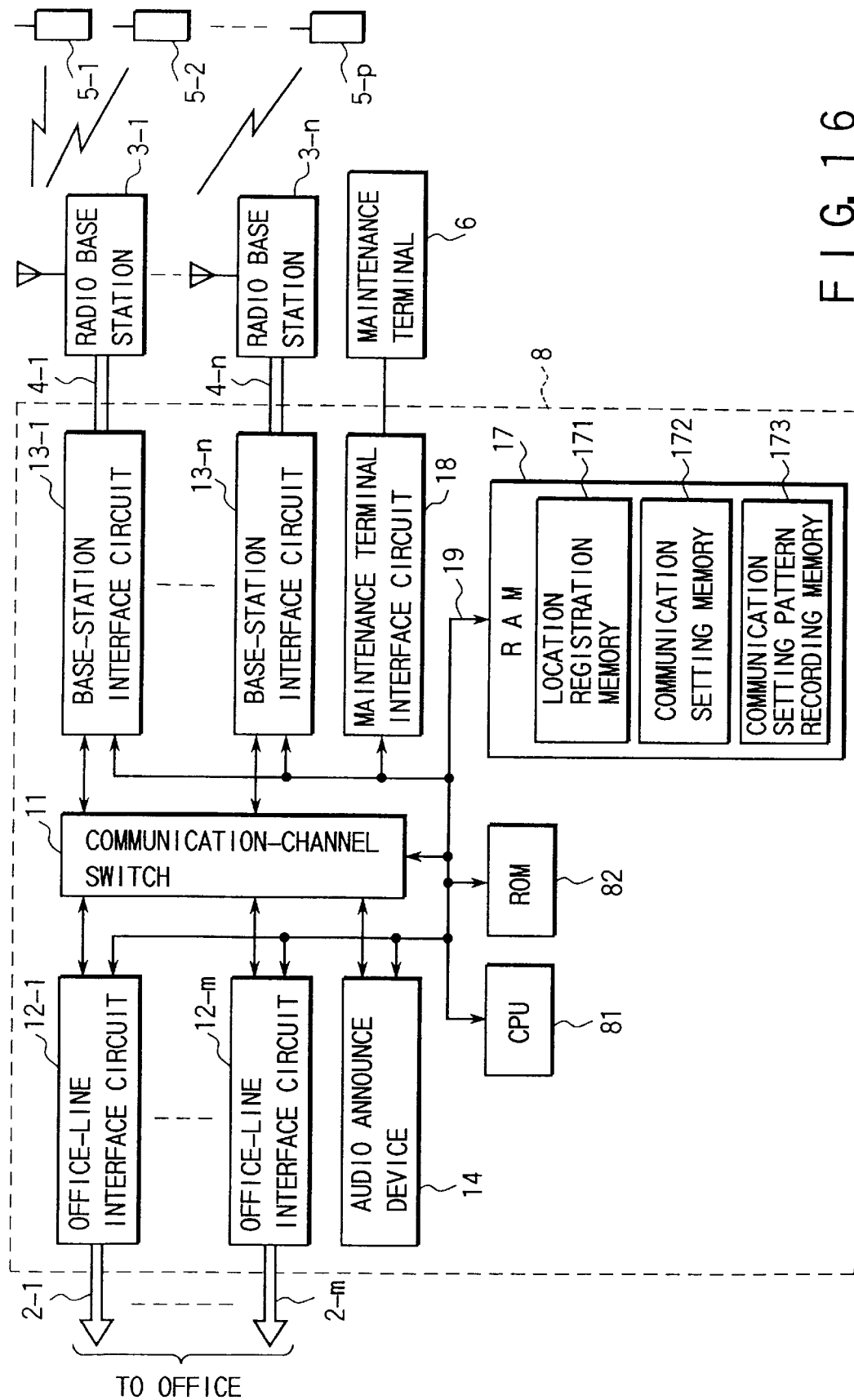
FIG. 16 is a block diagram of the configuration of a communication control apparatus according to a third embodiment of the present invention.

FIG. 16 is a block diagram of the configuration of a communication control apparatus according to a third embodiment of the present invention. In FIG. 16, the same parts as those of FIG. 1 are indicated by the same reference symbols and a detailed explanation of them will not be given.

In FIG. 16, reference numeral 8 indicates a communication control apparatus. The communication control apparatus 8 is connected to offices (not shown) of a communication network via a plurality of (an m number of) office lines 2 (2-1 to 2-m) and accommodates a plurality of (an n number of) radio base stations 3 (3-1 to 3-n) distributed in a specific service area (e.g., within specific facilities) via communication channels 4 (4-1 to 4-n), respectively. The communication control apparatus 8 manages a plurality of mobile stations 5 (5-1 to 5-p), such as cordless telephones, located in the communication area of each of the radio base stations 3 and performs call control between mobile stations 5 or between terminals connected via office lines 2 and mobile stations 5, as the need arises.

The radio base stations 3 and mobile stations 5 are connected to each other via radio channels. The four-channel multiplex multicarrier TDMA (Time Division Multiple Access)-TDD (Time Division Duplex) scheme or the like is used for the method of accessing the radio channels.

The communication control apparatus 8 comprises a communication-channel switch 11, a plurality of (an m number of) office-line interface circuits 12 (12-1 to 12-m), a plurality of (an n number of) base-station interface circuits 13 (13-1 to 13-n), an audio announce device 14, a RAM 17, a maintenance terminal interface circuit 18, a CPU 81, and a ROM 82. These component parts are connected to each other via a bus 19. The office-line interface circuits 12-1 to 12-m, base-station interface circuits 13-1 to 13-n, and audio announce device 14 are connected to the communication-channel switch 11.

Namely, the communication control apparatus 8 of the third embodiment has the same configuration as that of the communication control apparatus 1 of the first embodiment except that the CPU 81 and ROM 82 are provided in place of the CPU 15 and ROM 16.

The CPU 81 operates according to the operation program stored in the ROM 82, thereby controlling each circuit in the communication control apparatus 8 and realizing the operation of the communication control apparatus.

The ROM 82 fixedly stores the operation program of the CPU 81 and the data necessary for the CPU 81 to control each circuit in the communication control apparatus 8.

The CPU 81 realizes various functions by operating according to the operation program stored in the ROM 82. FIG. 17 is a functional block diagram schematically showing the relationship between various functions that the CPU 81 realizes.

As shown in the figure, the functions the CPU 81 realizes include a mobile station management section 151, a mobile station location registration section 152, a mobile station location searching section 154, a communication setting searching section 155, a communication settings setting section 156, a communication setting pattern registration section 157, a call control section 811, and a radio control section 812.

Namely, the functions the CPU 81 realizes are almost the same as those the CPU 15 of the first embodiment realizes except that the call control section 811 is realized in place of the call control section 153 and the radio control section 812 is added.

The call control section 811 performs not only the processing done by the call control section 153 but also the process of informing a busy mobile station 5 of the state of regulation enforcement. Receiving the system information system information notice message, the radio control section 812 carries out the process of informing the mobile station 5 of the state of regulation enforcement.

Next, the operation of the communication control apparatus 8 thus constructed will be explained.

The main control section 81 executes the various processes executed by the main control section 15 of the first embodiment almost in the same manner. In addition to this, the radio control section 812 in the main control section 81 executes the following process.

Specifically, when receiving the communication setting complete signal generated at the communication settings setting section 156 at the time that the communication settings setting section 156 has completed the communication setting pattern change process, the radio control section 812 executes the system information notice message change process as shown in FIG. 18.

When beginning the system information notice message change process, the radio control section 812 first searches for the radio zone for which the setting of whether telephone conversations are permitted or inhibited has been changed as a result of the change of the communication setting pattern (step ST61) and judges whether or not the relevant radio zone is present (step ST62).

If having found one relevant radio zone, the radio control section 812 searches the communication setting memory 172 for the communication setting for the radio zone (step ST63). Then, on the basis of the search result, the radio control section edits the system information notice message (step ST64). The editing of the system information system information notice message is the process of setting information on the permission or inhibition of use of a radio base station (permission or inhibition of zone selection) in the system information notice message for the permitted state when telephone conversations are allowed, and setting the same information for the inhibited state when telephone conversations are inhibited.

Then, the radio control section 812 gives the edited system information system information notice message to all of the radio base stations in the radio zone and requests them to switch the system information system information notice message (step ST65).

Thereafter, the radio control section 812 repeats the processes ranging from step ST61 to step ST65 until it has judged at step ST62 that the relevant radio zone is not present. This causes the system information system information notice message to be switched for all of the radio zones for which the setting of the permission or inhibition of telephone conversations has been changed. Then, when the radio control section 812 has judged at step ST62 that the relevant radio zone is not present after having completed the processes concerning all of the radio zones for which the setting of the permission or inhibition of telephone conversations has been changed, it terminates the system information notice message change process.

Each of the radio base stations 3 sends a system information system information notice message periodically. When being requested by the communication control apparatus to switch the system information system information notice message, the radio base station then sends the given system information notice message.

In the wait state, each mobile station 5 receives the system information system information notice message periodically sent from the radio base station 3. When being unable to receive the system information system information notice message, the mobile station 5 judges that it is located outside the service area and give an outside-of-communication-range representation.

When having received the system information system information notice message, the mobile station 5 checks the base-station information. The base-station information includes information on whether or not the radio base station 3 can be used, the specification of specified user service station/unspecified user service station, and the specification of priority station/ordinary station. The mobile station 5 judges whether or not it can communicate using the radio base station 3 that is sending the base-station information, by determining whether or not the station itself conforms to the specifications in the base-station information. If having judged that it cannot communicate, the mobile station 5 provides an outside-of-communication-range representation.

Therefore, by controlling the information as to whether or not the radio base station can be used, depending on whether telephone conversations are permitted or inhibited, it is possible to cause the mobile station 5 located in a radio zone where telephone conversations are inhibited to provide an outside-of-communication-range representation.

Because the busy mobile station 5 does not receive the system information system information notice message, the above-described means cannot cause the busy mobile station 5 to provide an outside-of-communication-range representation.

The base-station information, however, can be given to the busy mobile station 5 through the zone information notice message, using the control channel (FACCH, SACCH) on the communication channel.

Then, the call control section 811 carries out the telephone conversation interruption process in almost the same manner as in the first embodiment except that the call control section 811 starts up the disconnect timer at step ST34 as shown in FIG. 19 and then edits and transmits the zone information notice message (step ST71). At this time, the call control section 811 sets the information as to whether or not the radio base station can be used in the inhibited state in the zone information notice message and gives this information to the mobile station 5 using the control channel on the communication channel. This then causes the busy mobile station 5 to provide an outside-of-communication-range representation.

As described above, with the third embodiment, because the mobile station 5 that is inhibited from telephone conversations is caused to provide an outside-of-communication-range representation, it is possible to let the user know that he or she cannot make a call at present. Furthermore, with the third embodiment, because the function of providing an outside-of-communication-range representation that an ordinary mobile station 5 has is used, it is not necessary to provide the mobile station 5 with a special function, so the communication control apparatus has a great deal of flexibility.

The present invention is not restricted to the above-described embodiments, but may be practiced or embodied in still other ways without departing from the spirit or essential character thereof.

The communication setting pattern set in the communication setting memory 172 may be such that, for example, the contents of regulation are set according to the type of call (e.g., call originating, call terminating, busy, and handover) as shown in FIG. 20 and whether or not telephone conversations are permitted may be determined by call type. Specifically, for example, in FIG. 20, in the radio zone named "Z-2," telephone conversations caused by new call originating and terminating are inhibited. When telephone conversations are in progress at the time of the setting of the communication setting pattern or when the user moves into the radio zone, while keeping telephone conversations, the telephone conversations are allowed to continue. The types of call are not limited to four shown in FIG. 20, and may be as many as needed.

The communication setting pattern set in the communication setting memory 172 may be such that, for example, the contents of regulation are set according to the type of mobile stations (e.g., telephone mobile station and data mobile station) as shown in FIG. 21 and whether or not telephone conversations are permitted may be made different, depending on the type of mobile station 5. Specifically, for example, in FIG. 21, in the radio zone named "Z-3," the telephone mobile stations are inhibited from making a call, regardless of the type of call. The data mobile stations are inhibited from holding telephone conversations caused by new call originating or terminating, but when telephone conversations are in progress at the time of the setting of the communication setting pattern or when the user moves into the radio zone, while holding telephone conversations, the data mobile stations are permitted to continue the telephone conversations. The number of types of mobile stations 5 is not limited to two shown in FIG. 21, and may be as large as needed. Furthermore, while in FIG. 21, whether or not telephone conversations are permitted is set according to both of the type of the mobile station 5 and the type of call, it may be set according to only the type of mobile station 5.

While in the first embodiment, any one of the previously registered communication setting patterns is automatically selected according to time zone, the communication setting pattern to be used may be changed according to the instruction of the maintenance man. For example, this is realized in such a manner that, in response to the instruction to change the communication setting pattern to be used, the communication setting section 156 sets the specified one of the communication setting patterns in the communication setting memory 171. Alternatively, the same is realized in such a manner that the communication setting pattern recording memory 173 and communication settings setting section 156 are eliminated and the communication pattern registration section 157 directly updates the communication setting pattern stored in the.communication setting memory 172.

In each of the above-described embodiments, when the call process corresponding to a call request is not carried out, an audio message is sent to the calling party, but the message is not necessarily sent. Instead of the audio message, a busy tone may be sent.

While in the above embodiments, the call is disconnected after a specific allowable time has elapsed, in a case where as a result of the change of the communication setting pattern or the handover process, the busy mobile station 5 has moved and stayed in the radio zone where telephone conversations are inhibited, the call may be disconnected immediately without waiting for the allowable time to elapse. Furthermore, when telephone conversations has been inhibited in the radio zone where a handover request has been made, handover itself may be refused.

The part of the mobile stations 5 that have been registered previously may be allowed to hold telephone conversations, regardless of communication setting pattern. This enables a flexible operation of the communication control apparatus in such a manner that, for example, only the employees in the facilities where a service zone has been formed are permitted to hold telephone conversations.

While in the second embodiment, the instruction to update the communication setting pattern is accepted by special service code, the mobile station 5 may be provided with the function of transmitting a special signal for specifying the update of the communication setting pattern and the instruction to update the communication setting pattern may be accepted using the signal.

While in the third embodiment, the function of providing an outside-of-communication-range representation that an ordinary mobile station has is used to display the refusal of telephone conversations, a special signal for notifying the refusal of telephone conversations may be produced and used to inform the mobile station 5 of the refusal of telephone conversations, and the mobile station 5 may display the refusal state of telephone conversations in addition to providing an outside-of-communication-range representation.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalent.

I claim:

1. A communication control apparatus which controls each of a plurality of radio base stations that are distributed in a specific service area and communicate by radio with mobile stations located in each communication area covered by the corresponding base station in the service area and which enables said mobile stations to make mobile radio communication, said communication control apparatus comprising:

first storage means for storing communication permit/ inhibit information that indicates whether the mobile radio communication is permitted or inhibited for each radio zone which is set for one of said communication areas or for a set of some of said communication areas; and call processing means that, when a call request related to a mobile station located in said service area has been made, judges whether or not communication is permitted in the radio zone where the mobile station related to the call request is located, on the basis of the communication permit/inhibit information stored in said first storage means, and that carries out the call process corresponding to said call request only when communication is permitted, and that disconnects the call related to the mobile station when the communication permit/inhibit information stored in said first storage means is changed and a communicating mobile station is located in the radio zone where communication is inhibited by the changed communication permit/inhibit information.

2. A communication control apparatus according to claim 1, further comprising:

second storage means for storing communication permit/ inhibit information on a plurality of patterns as candidate information; and communication permit/inhibit information setting means for causing said first storage means to store as communication permit/inhibit information any of the candidate information stored in the second storage means.

3. A communication control apparatus according to claim 2, further comprising:

third storage means for storing schedule information that causes time to correspond to candidate information to be selected, wherein said communication permit/inhibit information setting means, when the time shown in said third storage means has been reached, causes said first storage means to store candidate information corresponding to the time as communication permit/inhibit information.

4. A communication control apparatus according to claim 2, further comprising:

pattern switching instruction accepting means for accepting a specific communication permit/inhibit pattern switching instruction from said mobile station, wherein said communication permit/inhibit information setting means, responding to the communication permit/inhibit pattern switching instruction accepted by said pattern switching instruction accepting means, causes said first storage means to store as communication permit/inhibit information any of the candidate information stored in said second storage means.

5. A communication control apparatus according to claim 4, wherein said communication permit/inhibit pattern switching instruction accepted by said pattern switching instruction accepting means is a call origination with a specific special service code.

6. A communication control apparatus according to claim 4, further comprising:

specific terminal information storage means for storing the identification information on the mobile station registered as a mobile station that permits a communication permit/inhibit pattern switching instruction, wherein said communication permit/inhibit information setting means, responding to the communication permit/inhibit pattern switching instruction from the mobile station whose identification information is stored in said specific terminal information storage means, causes said first storage means to store as communication permit/ inhibit information any of the candidate information stored in said second storage means.

7. A communication control apparatus according to claim 1, wherein:

said communication permit/inhibit information is the information that indicates whether or not communication is permitted wherein the permission or inhibition corresponds to any one of or a combination of call type, call state, mobile station type, and mobile station number; and said call processing means, on the basis of the radio zone where the mobile station is located and of the conditions included in said communication permit/inhibit information, judges whether or not the call process related to the mobile station is carried out or whether or not the call related to the mobile station is disconnected.

8. A communication control apparatus according to claim 1, further comprising:

audio message generating means for generating a specific audio message, wherein said call processing means, when not carrying out the call process corresponding to a call originating request because communication in the radio zone where the mobile station that has made said call originating request is located is inhibited, causes said audio message generating means to generate a specific audio message to the effect that communication is inhibited and sends the message to the mobile station that has made the call request.

9. A communication control apparatus according to claim 1, further comprising:

audio message generating means for generating a specific audio message, wherein said call processing means, when not carrying out the call process corresponding to a call originating request because communication in the radio zone where the mobile station specified as a mobile station that is designated as a call-addressed station in the call originating request is located is inhibited, causes said audio message generating means to generate a specific audio message to the effect that the mobile station designated as the call-addressed station is inhibited from communicating and sends the message to the mobile station that has made the call originating request.

10. A communication control apparatus according to claim 1, further comprising:

audio message generating means for generating a specific audio message, wherein said call processing means, before disconnecting the call related to the communicating mobile station, causes said audio message generating means to generate a specific audio message to the effect that the call will be disconnected because communication is inhibited and sends the message to the communicating mobile station.

11. A communication control apparatus according to claim 1, further comprising:

audio message generating means for generating a specific audio message, wherein said call processing means, when being requested for handover by a mobile station located in the radio zone where communication is inhibited, carries out a handover process according to the request and causes said audio message generating means to generate a specific audio message to give notice of disconnection and sends the message to the mobile station that has made a request for the handover, and thereafter disconnects the call after a specific time has elapsed.

12. A communication control apparatus according to claim 1, further comprising:

communication inhibition alarming means for causing the radio base station corresponding to the radio zone where a mobile station is inhibited from communicating in the communication permit/inhibit information stored in said first storage means to send the information to the effect that the radio base station cannot be used in the form of an system information notice message that the radio base station sends periodically.

13. A communication control apparatus according to claim 1, further comprising:

communication inhibition alarming means for causing the radio base station corresponding to the radio zone where mobile stations are inhibited from communicating in the communication permit/inhibit information stored in said first storage means to send the information to the effect that the radio base station cannot be used by a communicating mobile station via the radio base station by way of the radio channel that said communicating mobile station is using.

* * * * *